Figure 1:
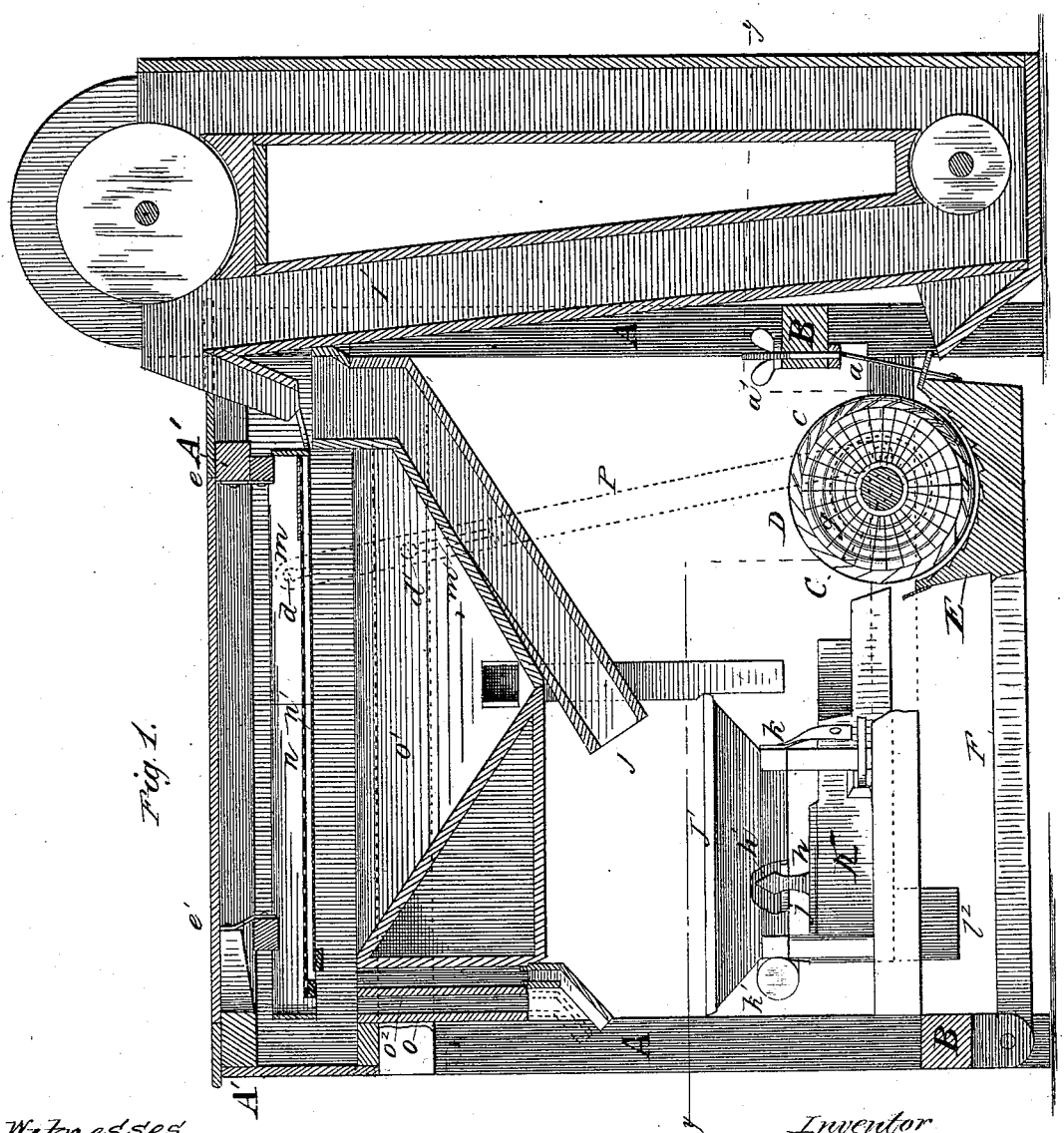

2 Sheets—Sheet 1.

J. G. MORRIS.
Corn-Shelling and Grinding Machine.

No. 200,215. Patented Feb. 12, 1878.

Witnesses
Inventor
Joseph G. Morris
per DeWitt C. Allen.
atty.

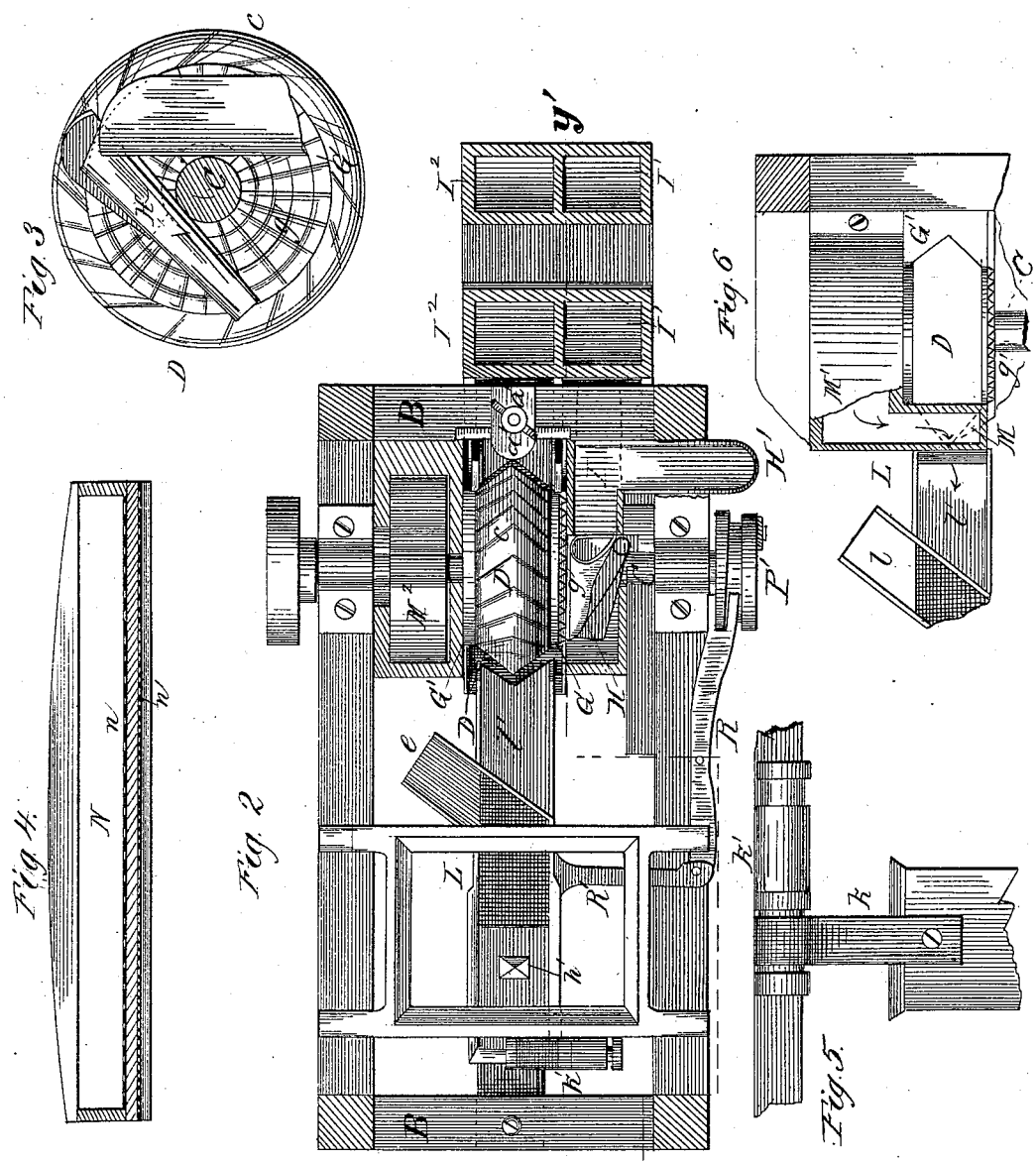

UNITED STATES PATENT OFFICE.

JOSEPH G. MORRIS, OF CHICAGO, ILLINOIS, ASSIGNOR OF ONE-HALF HIS RIGHT TO WILLIAM H. CREMINS, OF SAME PLACE.

IMPROVEMENT IN CORN SHELLING AND GRINDING MACHINES.

Specification forming part of Letters Patent No. 200,215, dated February 12, 1878; application filed January 11, 1878.

*To all whom it may concern:*

Be it known that I, JOSEPH G. MORRIS, of Chicago, in the county of Cook and State of Illinois, have invented certain new and useful Improvements in Portable Farm-Mills; and I do hereby declare the following to be a full, clear, and exact description of the same, reference being made to the accompanying drawings, forming a part of this specification, and in which—

Figure 1 represents a longitudinal central vertical section of my improved mill through the line $y'$ $y'$ of Fig. 2. Fig. 2 is a horizontal section through the line $y$ $y$ of Fig. 1. Figs. 3, 4, 5, and 6 are detail views.

This invention relates to improvements in portable farm-mills for shelling corn and grinding it into meal, and separating the same, having for its object simplicity in the construction and operation of the various parts thereof; and the invention consists in the construction, combination, and arrangement of parts, as will be hereinafter fully described.

In the drawings, A represents the vertical posts, and B the cross-sills, forming the main frame of the mill. C represents a horizontal shaft journaled in the lower cross-sills B of the mill-frame. D represents a cylindrical burr-stone, centrally secured upon the shaft C, and E represents the usual concave bed, which is supported upon one end of the pivoted beam F, the concave bed being adjusted vertically and secured in any desired position by means of the metallic strap $a$ and thumb-screw $a'$. Both the stone and concave bed are provided with angle-furrows $c$, the furrows on the stone being arranged reversely to those on the concave bed, so that in operation the furrows produce a shearing cut upon the material being ground, and at the same time convey the material toward the center of the grinding-surfaces.

Upon each side of the stone or burr D, and connected thereto, are metallic plates G G', the metallic plate G being provided with a front serrated face, $g$, which forms the corn-shelling disk. The object of a metallic plate upon each side of the stone is to more evenly balance said stone, to prevent chipping off of the stone, and also for securing it to the shaft, the metallic plates being screwed onto the shaft in the usual manner.

H represents the usual yielding throat, through which the ears of corn are fed, and at the same time held against the shelling-disk. H' represents the discharge-spout for the corn-cobs, and I a spout (shown in dotted lines) which discharges the shelled corn into the conveyer $I^1$, from which it is discharged, through spout J, into the feeding-hopper J'. The hopper J' is provided with a hole or opening, $j$, in its bottom, through which the corn is fed to the shaking or vibrating shoe K. This shoe is suspended from the hopper J' by means of the straps $k$, two at the front end and one at the rear end, the rear strap being secured to a roller or shaft, $k'$, by means of which the rear end of the shoe can be raised or lowered to increase or decrease the flow of the material to the grinding mechanism. The shoe is provided with a stationary valve, $h$, having an enlarged head, $h'$, which extends up through the opening $j$ in the hopper, and which stirs up and prevents the material from clogging up said opening when the shoe is shaken or vibrated. When it is desired to increase or decrease the amount of feed, the rear end of the shoe is raised or lowered, which raises or lowers the valve $h$ $h'$, thus enlarging or decreasing the size of the opening through the hopper, the shoe at the same time being inclined more or less, and thus correspondingly increasing or decreasing the flow of the material to the grinding mechanism.

L represents a screen arranged in the shoe K, through which the corn is bolted, while any large substances contained therein are separated therefrom and discharged through spout $l$. The corn passing through said screen is discharged through spout $l^1$ to the grinding mechanism.

M represents a spout, communicating from the fan-case $M^1$ with spout $l^1$, and by which the corn is subjected to a blast from the fan $M^2$, arranged upon the shaft C, and by which the chaff and other light impurities are separated from the corn and discharged through spout I².

The ground meal, from the grinding mechanism, is discharged into the conveyer I², which conveys and discharges it through a spout onto the oscillating and reciprocating riddle N, which is provided with two screens, n n', clothed, respectively, with coarser and finer meshes of cloth. The screen n separates the bran from the meal, the bran passing over the tail of screen n into discharge-spout o, and the meal bolted through the screen onto screen n', and through which the fine flour is bolted into hopper o¹, while the corn-meal passes over the tail of screen n' into discharge-spout o², all as clearly shown in Fig. 1.

The riddle N is centrally suspended at each end from the cross-beams A' by means of the hangers e e', and by which the inclination of said riddle can be adjusted to regulate the flow of the material over the screens.

In the class of machines wherein the material is delivered in a heated condition direct from the burrs onto the screen or screens, it it essential that the riddle be given such movements as will keep the material in such agitation as to throw the coarsest and lightest material to the top, and also prevent the screen or screens from clogging, so as to allow the material to be bolted freely, which is effectually accomplished by the oscillating, longitudinal, reciprocating, or vibrating and jarring movements imparted thereto. To communicate these movements to the riddle I employ a connecting-rod, P, having one end eccentrically connected to the eccentric-wheel P' upon shaft C, whereby a crank movement is given to said rod P. The other end of rod P is connected to a pin, d, on one side of the riddle, the connecting-rod P being formed with a short longitudinal slot, m, working over the pin d on the riddle, which allows the riddle to remain motionless for a short time at the close of each oscillation, while the eccentric-wheel P' continues to turn and moves the connecting-rod, while the riddle, being suspended, as before described, receives a sudden jarring movement at each end of the stroke of the connecting-rod upon the pin d, which agitates and throws the lightest materials to the top, and keeps the meshes of the screens open.

In order to give the riddle a longitudinal vibrating or reciprocating movement I adjustably fulcrum the connecting-rod to the frame of the mill, which is accomplished by providing the rod P with a long longitudinal slot, m', working over the pin d', which allows the connecting-rod (by means of the crank movement imparted thereto) to give the longitudinal vibrating or reciprocating movement to the riddle without interfering with the crank movement of the connecting-rod for oscillating the riddle.

The feeding-shoe K is shaken or vibrated through the medium of the pivoted connecting-lever R and arm R', connected therewith and operated by the eccentric-wheel P'.

The elevators are operated through the medium of pulleys on the main shaft C and the shaft of the elevator by connecting-bands, in the usual manner, or by any other equivalent mechanism. The mill can also be driven by any suitable motor-power applied to the main shaft C.

The operation of my improved mill is as follows: The corn in the ear is fed to the corn-shelling mechanism, from which the shelled corn is discharged into the elevator I¹, and from thence, by means of spout J, discharged into hopper J', where it is fed into the shaking-shoe K, and the extraneous matters separated therefrom by screen and blast, and from said shoe the corn is delivered to the grinding mechanism, and the ground meal discharged therefrom into elevator I², which discharges it through a spout onto the upper screen of the riddle, and, by the two screens contained therein, separated into the different grades desired.

It will therefore be perceived that by my improved mill the corn is subjected to a continuous operation from the time the corn is fed to the mill in the ear until it is reduced to meal and separated into the different grades desired.

I do not desire to limit myself to the precise arrangement and construction of mechanism herein described, as they may be varied, changed, or modified to some extent without departing from the object of my invention.

I am aware that the corn-shelling, elevating or conveying, and grinding mechanism, separately considered, are old, and such I do not desire to claim, broadly, as my invention; but,

Having thus fully described my invention, what I claim as new, and desire to secure by Letters Patent, is—

1. In a portable mill, the combination of the corn-shelling, cob-separating, elevating or conveying, feeding and cleaning, grinding, and bolting and separating mechanisms, substantially as and for the purpose herein shown and described.

2. The combination of the grinding-burr D, metallic plate G', and corn-shelling plate or disk G, connected together and arranged upon the shaft C, substantially as and for the purposes specified.

3. The combination, with the hopper J', provided with the bottom opening j, of the vertically adjustable and shaking or vibrating shoe K, having the valve h with enlarged head h', the several parts constructed and relatively arranged to operate substantially in the manner herein shown and described.

4. The combination of the riddle, centrally suspended by hangers and mechanism, substantially as described, whereby said riddle is adapted to receive oscillating, reciprocating, or vibrating and jarring movements, substantially as and for the purpose specified.

5. The combination, with the riddle and wheel P', or its equivalent, of a connecting-rod, provided with longitudinal slots $m$ $m'$ playing upon the pins $d$ $d'$, substantially as and for the purpose specified.

JOSEPH G. MORRIS.

Witnesses:
   DeWITT C. ALLEN,
   N. L. ALLEN.